(12) United States Patent
Murakami (10) Patent No.: US 7,855,808 B2
(45) Date of Patent: Dec. 21, 2010

(54) PRINTING SYSTEM AND PRINTING APPARATUS

(75) Inventor: Masahiro Murakami, Hekinan (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 571 days.

(21) Appl. No.: 11/902,561

(22) Filed: Sep. 24, 2007

(65) Prior Publication Data

US 2008/0130027 A1    Jun. 5, 2008

(30) Foreign Application Priority Data

Sep. 29, 2006   (JP)   ............... 2006-266911

(51) Int. Cl.
H04N 1/60   (2006.01)
(52) U.S. Cl. ........................ 358/1.9; 358/518
(58) Field of Classification Search .................. None
See application file for complete search history.

(56) References Cited

U.S. PATENT DOCUMENTS

| | | | | |
|---|---|---|---|---|
| 5,986,642 | A * | 11/1999 | Ueda et al. | 345/600 |
| 6,262,817 | B1 * | 7/2001 | Sato et al. | 358/518 |
| 6,671,394 | B1 * | 12/2003 | Sako | 382/132 |
| 6,980,320 | B2 * | 12/2005 | Ito | 358/1.18 |
| 7,315,387 | B2 * | 1/2008 | Nishikawa | 358/1.15 |
| 7,327,477 | B2 * | 2/2008 | Okajima | 358/1.1 |
| 7,333,242 | B2 * | 2/2008 | Yamamoto | 358/2.1 |
| 7,428,069 | B2 * | 9/2008 | Fujio et al. | 358/1.15 |
| 7,525,684 | B2 * | 4/2009 | Majewicz | 358/1.9 |
| 2004/0257598 | A1 * | 12/2004 | Fujio et al. | 358/1.9 |
| 2005/0030563 | A1 * | 2/2005 | Matsunami et al. | 358/1.9 |
| 2006/0050307 | A1 * | 3/2006 | Koike | 358/1.15 |
| 2007/0273942 | A1 * | 11/2007 | Miyata | 358/518 |
| 2009/0086244 | A1 * | 4/2009 | Matoba | 358/1.13 |

FOREIGN PATENT DOCUMENTS

| | | |
|---|---|---|
| JP | 10-233931 | 9/1998 |
| JP | 10-322562 | 12/1998 |
| JP | 2000-217007 | 8/2000 |
| JP | 2001-30583 | 2/2001 |
| JP | 2003-266898 | 9/2003 |
| JP | 2003-345564 | 12/2003 |

(Continued)

OTHER PUBLICATIONS

Chinese Office Action, with English Translation, issued in Chinese Patent Application No. CN 200710162313.7, dated Mar. 20, 2009.

(Continued)

*Primary Examiner*—Mark K Zimmerman
*Assistant Examiner*—Dung D Tran
(74) *Attorney, Agent, or Firm*—McDermott Will & Emery LLP (57) ABSTRACT

A printing system includes a processing device, a printing device and a display device. The processing device processes image data in accordance with a set image quality parameter. The printing device performs a printing process of an image represented by the image data processed by the processing device. The display device displays an adjustment screen for adjusting the image quality parameter after the printing process of the image by the printing device is started.

15 Claims, 9 Drawing Sheets

FOREIGN PATENT DOCUMENTS

| | | |
|---|---|---|
| JP | 2004-291278 | 10/2004 |
| JP | 2005-161753 | 6/2005 |
| JP | 2005-267485 | 9/2005 |
| JP | 2005-271262 | 10/2005 |
| JP | 2006-168079 | 6/2006 |

OTHER PUBLICATIONS

Japanese Office Action, with English Translation, issued in Japanese Patent Application No. JP 2006-266911, mailed Oct. 28, 2008.

* cited by examiner

PRINTING SYSTEM AND PRINTING APPARATUS

CROSS-REFERENCE TO RELATED APPLICATIONS

This application claims the benefit of Japanese Patent Application No. 2006-266911 filed Sep. 29, 2006 in the Japan Patent Office, the disclosure of which is incorporated herein by reference.

BACKGROUND

This invention relates to a printing system for printing an image.

There is a known printing system in which an adjustment screen for adjusting image quality parameters is displayed to allow a user to adjust an image quality of an image to be printed. Adjustment of image quality parameters usually requires actually printing an image and performing fine-control based on a printing result, and thus may be achieved after a process of trial and error until a desired printed image is obtained. In a proposed configuration of a printing system, parameter set information, which is set depending on an image quality type, is externally introduced.

SUMMARY

However, the proposed configuration only provides a plurality of types of pattern set information depending on image quality types, and is not applicable to a case where a user performs image quality adjustment according to the user's own preference. Furthermore, an optimal image quality adjustment cannot be achieved by using preset pattern set information since each image requires each adjustment level.

It is, therefore, desirable to provide a printing system and a printing apparatus which may reduce complication in adjusting image quality parameters.

One aspect of the present invention may provide a printing system including a processing device, a printing device and a display device.

In the one aspect of the present invention, the processing device processes image data in accordance with a set image quality parameter. The printing device performs a printing process of an image represented by the image data processed by the processing device. The display device displays an adjustment screen for adjusting the image quality parameter after the printing process of the image by the printing device is started.

Another aspect of the present invention may provide a printing apparatus including a storage device, a processing device and a printing device.

In the another aspect of the present invention, the storage device stores image data received from an information processing apparatus. The processing device reads out the image data stored in the storage device and processes the image data in accordance with a received image quality parameter each time the processing device receives the image quality parameter from the information processing apparatus. The printing device performs a printing process of an image represented by the image data processed by the processing device.

BRIEF DESCRIPTION OF THE DRAWINGS

The invention will now be described below, by way of example, with reference to the accompanying drawings, in which.

DETAILED DESCRIPTION OF THE PREFERRED EMBODIMENT

1. First Embodiment

A printing system according to a first embodiment will now be described.

[1-1. Overall Configuration]

Figure 1:
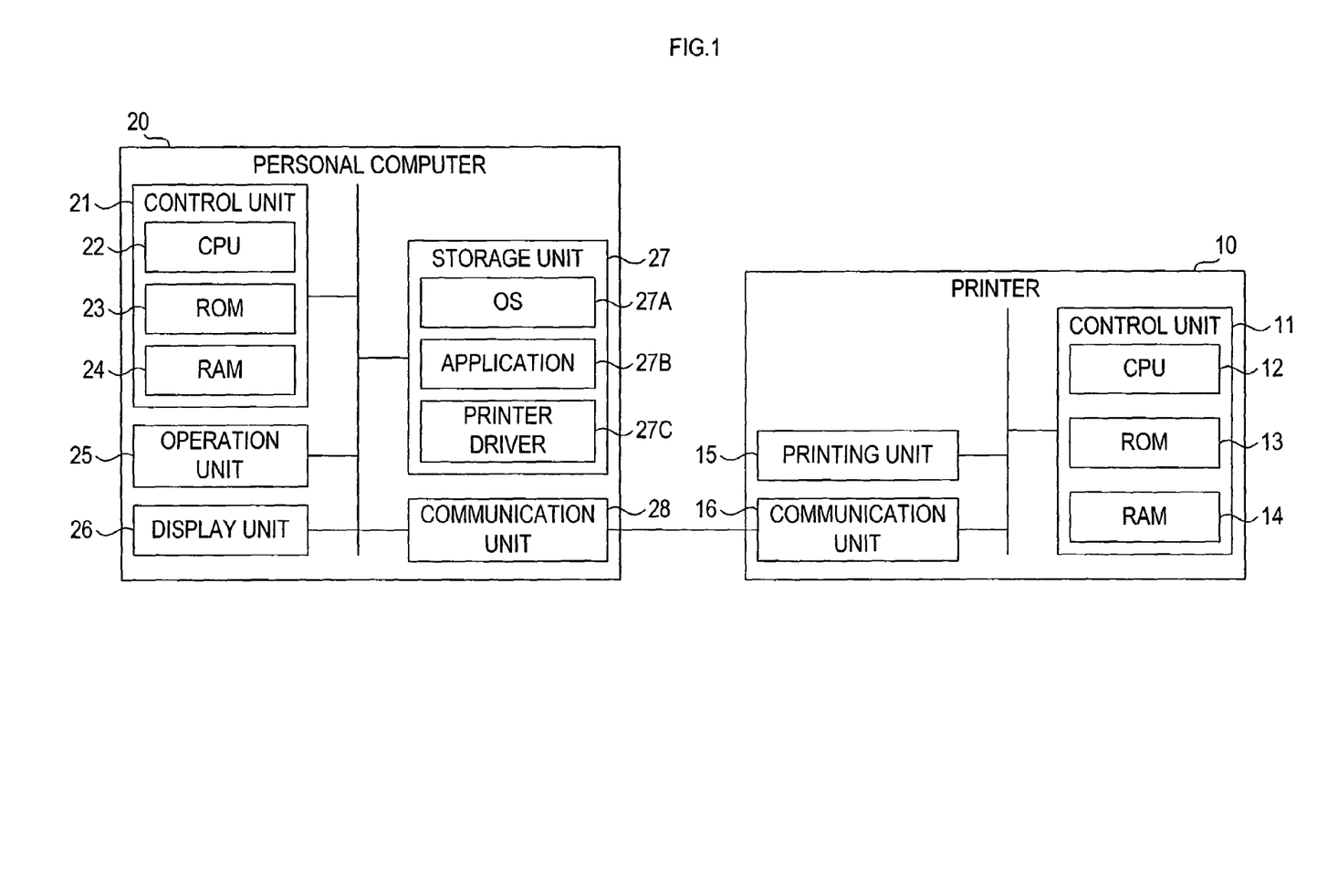
FIG. 1 is a block diagram showing a schematic configuration of a printing system in a first embodiment of the present invention.

As shown in FIG. 1, the printing system according to the first embodiment includes a printer 10 and a personal computer (a PC) 20. The printer 10 and the personal computer 20 in the printing system are inter-communicable via a network (a LAN: Local Area Network in the present embodiment).

[1-2. Configuration of Personal Computer]

The personal computer 20 includes a control unit 21, an operation unit 25, a display unit 26, a storage unit 27 and a communication unit 28.

The control unit 21 includes, as a major component, a known microcomputer having a CPU 22, a ROM 23, a RAM 24, and others, and comprehensively controls components constituting the personal computer 20. The operation unit 25 is provided for inputting a command by an external operation of a user. A keyboard or a pointing device (such as a mouse), for example, may be used as the operation unit 25. The display unit 26 is provided for displaying a variety of information as a visual image viewable by a user. A liquid crystal display, for example, may be used as the display unit 26. The storage unit 27 is provided for storing a variety of information. A hard disk device, for example, may be used as the storage unit 27. An operating system (OS) 27A, an application program (hereinafter simply referred to as the "application") 27B, such as word processing software or image viewing software, and a printer driver 27C for the printer 10 are installed in the storage unit 27. The communication unit 28 performs a data transmission/reception process via the network.

[1-3. Configuration of Printer]

The printer 10 includes a control unit 11, a printing unit 15 and a communication unit 16.

The control unit 11 includes, as a major component, a known microcomputer having a CPU 12, a ROM 13, a RAM 14 and others, and comprehensively controls components constituting the printer 10. The printing unit 15 performs printing of an image represented by image data on a recording medium (a medium on which an image is recorded (printed) and which is, for example, a sheet-like medium such as a sheet of paper) in accordance with a command from the control unit 11. A laser transfer method or an inkjet method, for example, may be an image printing method on the recording medium. The communication unit 16 performs a data transmission/reception process via the network.

[1-4. Process Performed by Personal Computer]

Figure 2:
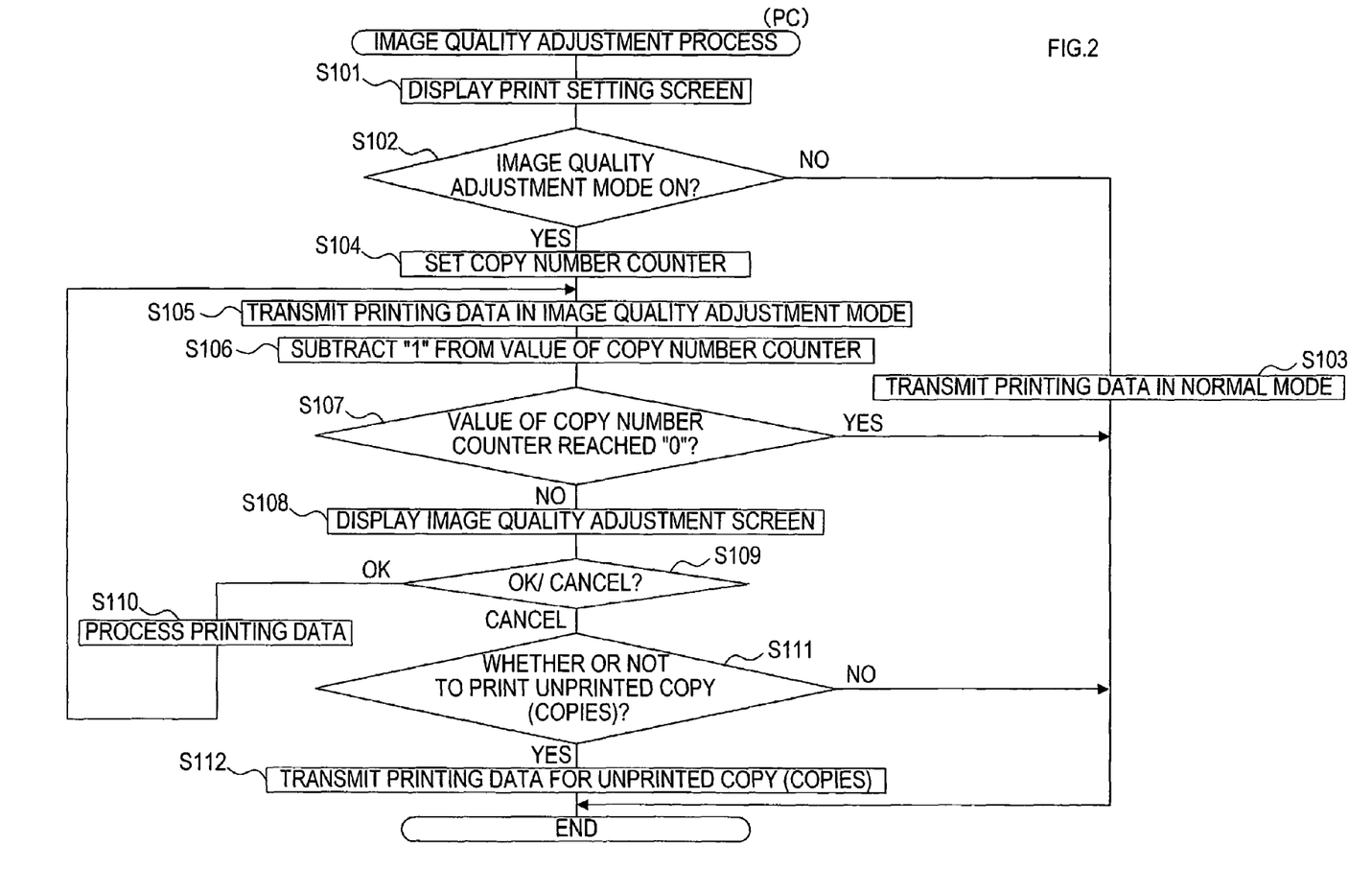
FIG. 2 is a flowchart of an image quality adjustment process in the first embodiment.

A description will now be provided with reference to a flowchart in FIG. 2 on an image quality adjustment process performed by the CPU 22 of the personal computer 20 as a processing by the printer driver 27C. The image quality adjustment process is started when a printing operation is performed by the application 27B executed by the personal computer 20.

Figure 3:
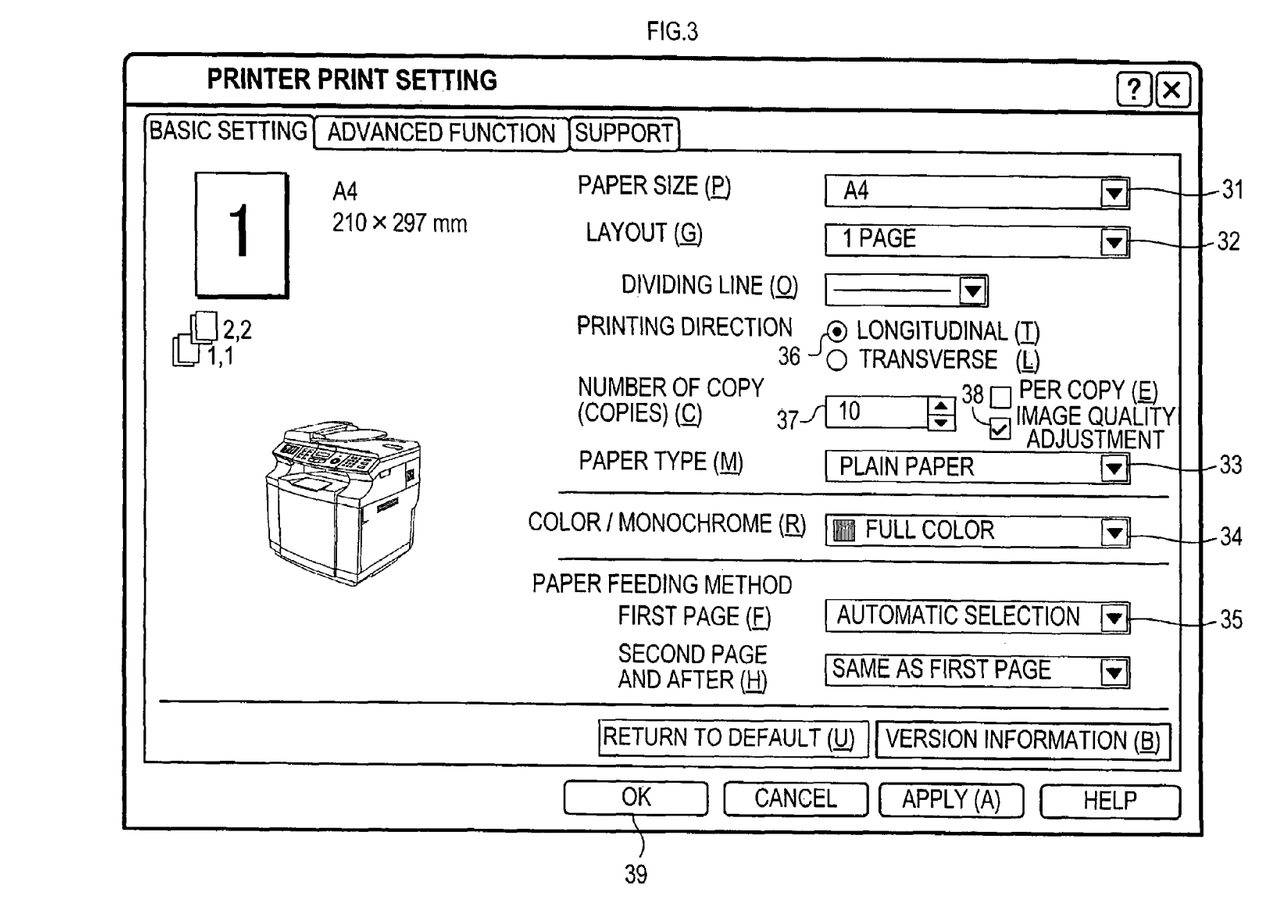
FIG. 3 is an explanatory view of a print setting screen in the first embodiment.

When the image quality adjustment process is started, a print setting screen is displayed on the display unit 26 in S101. As shown in FIG. 3, the print setting screen is a screen for setting a variety of printing conditions (paper size, layout, printing direction, number of copies to be printed, paper type, color/monochrome, paper feeding method, etc.). Specifically, pull-down boxes 31, 32, 33, 34 and 35, a radio button 36, a value input box 37, an image quality adjustment check box 38, and an OK button 39 are provided on the print setting screen. The pull-down boxes 31, 32, 33, 34 and 35 are provided for respectively setting a paper size, layout, paper type, number of copies to be printed, color/monochrome, and paper feeding method. The radio button 36 is provided for setting a printing direction and the value input box 37 is provided for setting a number of copies to be printed. The image quality adjustment check box 38 is provided for setting whether or not to perform image quality adjustment after printing an image (display conditions of a later described image quality adjustment screen).

When an operation to set the variety of printing conditions is performed with the operation unit 25 and an operation to press the OK button 39 (for example, an operation to click the OK button 39) is performed with the operation unit 25, the variety of printing conditions are set based on current setting details on the print setting screen (that is, the setting details are determined). Then the present process proceeds to S102.

In S102, it is determined whether or not an image quality adjustment mode is on (specifically, whether or not the image quality adjustment check box 38 is checked). The image quality adjustment mode is an operation mode in which the later described image quality adjustment screen is automatically displayed after printing of an image.

When it is determined in S102 that the image quality adjustment mode is not on, the present process proceeds to S103, and transmission of printing data in a normal mode (a normal operation mode in which the image quality adjustment screen is not automatically displayed) is performed. Specifically, the printing data (image data representing an image to be printed which is provided by the application 27B) is transmitted to the printer 10 through the communication unit 28 thereby to cause the printer 10 to perform printing of the number of copies to be printed which has been set in S101 (set through the value input box 37 on the print setting screen). Then, the present image adjustment process is terminated. The printing data transmitted as above is received by the communication unit 16 of the printer 10, and an image representing the printing data is printed by the printing unit 15.

When it is determined in S102 that the image quality adjustment mode is on, the present process proceeds to S104, and a value of a copy number counter (a counter which indicates a number of copies not yet printed out of the number of copies to be printed which has been set in S101) is set to the number of copies to be printed which has been set in S101.

In S105, a transmission process of printing data in the image quality adjustment mode is performed. Specifically, the printing data is transmitted to the printer 10 through the communication unit 28 thereby to cause the printer 10 to perform printing of only one copy regardless of the number of copies to be printed which has been set in S101. The printing data transmitted as above is received by the communication unit 16 of the printer 10, and an image represented by the printing data is printed by the printing unit 15.

In S106, "1" is subtracted from the value of the copy number counter.

Subsequently in S107, it is determined whether or not the value of the copy number counter has reached "0" (that is, whether or not printing of the number of copies to be printed, which has been set in S101, has been completed).

When it is determined in S107 that the value of the copy number counter has not reached "0", the present process proceeds to S108, and the image quality adjustment screen is displayed on the display unit 26.

There may be a variety of possible timings for a display process of the image quality adjustment screen in S108. For example, the display process may be performed after printing of the image by the printer 10 based on the printing data transmission process in S105 is completed.

Alternatively, the display process may be performed after the printing data transmission process in S105 is started and before printing of the image by the printer 10 based on the printing data transmission process is completed.

In other words, the display process may be a process to automatically display the image quality adjustment screen such that adjustment of image quality parameters later described in detail may be performed at the timing after starting of the printing process of the image and based on a printing result.

Figure 4A:
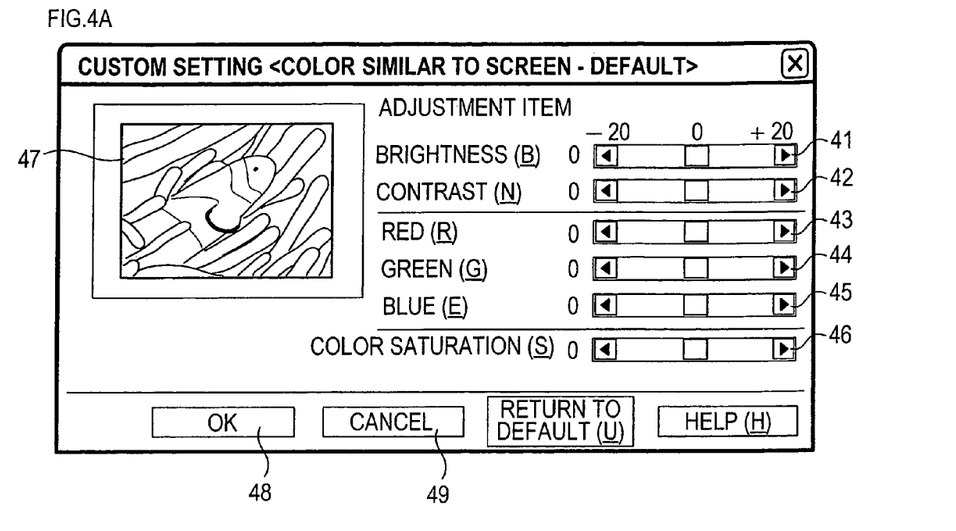
FIGS. 4A and 4B are explanatory views of an image quality adjustment screen in the first embodiment.

As shown in FIG. 4A, the image quality adjustment screen is a screen for setting image quality parameters of a printing image (brightness, contrast, RGB value and color saturation in the present example). Specifically, sliders 41, 42, 43, 44, 45, and 46 are provided on the image quality adjustment screen for adjusting amendment values of the respective image quality parameters. Each of the amendment values of the image quality parameters may be adjusted within a range from "−20" to "+20" by performing an operation of moving each of the sliders 41-46 in a right or left direction (for example by a drag operation) with the operation unit 25. Amendment values corresponding to respective positions of the moved sliders 41-46 are indicated in numerical values on respective left sides of the sliders 41-46. An image quality of a sample image 47 (unrelated to the current printing data) displayed on a left side of the image quality adjustment screen is changed in accordance with the adjusted amendment values thereby to show a possible printing result.

Figure 4B:
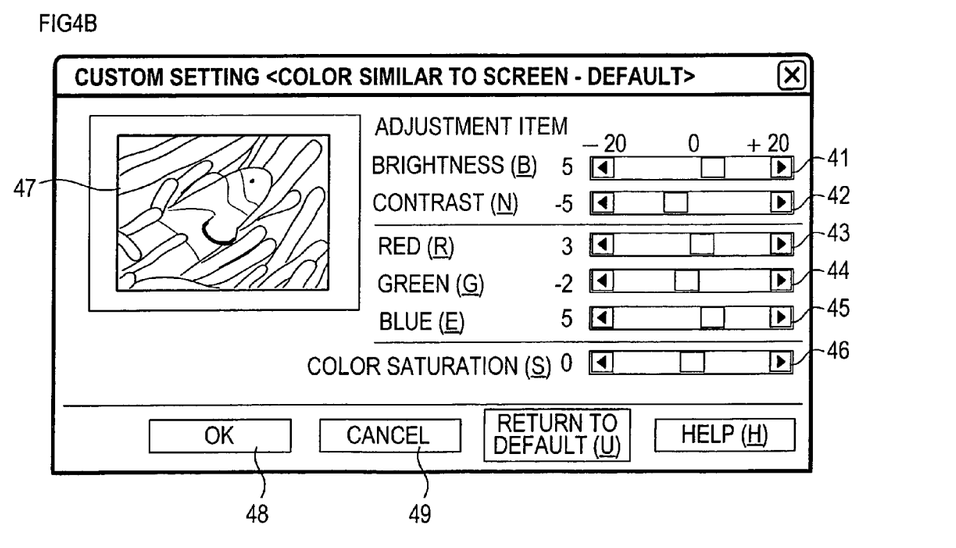

When the image quality adjustment screen is displayed initially in S108, currently set amendment values (amendment values indicating image quality parameters used in an immediately previous printing) are indicated as initial values. For example, when the amendment values have not been adjusted, the amendment values set to "0" are indicated as shown in FIG. 4A, while when the amendment values have already been adjusted, the currently set amendment values are indicated as shown in FIG. 4B.

When an operation of clicking an OK button 48 or a cancel button 49 provided on the image quality adjustment screen is performed with the operation unit 25, the image quality parameters are set in accordance with current setting details (i.e., the currently set amendment values) on the image quality adjustment screen (that is, the setting details are determined). Then, the present process proceeds to S109.

In S109, it is determined which of an operation of clicking the OK button 48 and an operation of clicking the cancel button 49 provided on the image quality adjustment screen has been performed.

When it is determined in S109 that the operation of clicking the OK button 48 has been performed, the present process proceeds to S110.

In S110, the printing data is processed in accordance with the set image quality parameters (the image quality parameters adjusted on the image quality adjustment screen).

Then, the present process returns to S105. Thus, an image represented by the printing data, which has been processed in accordance with the image quality parameters adjusted on the image quality adjustment screen, is printed with the printer 10.

When it is determined in S109 that the operation of clicking the cancel button 49 has been performed, the present process proceeds to S111.

In S111, it is determined whether or not to print remaining unprinted copy (copies) out of the number of copies to be printed set in S101 in accordance with the currently set image quality parameters. Specifically, for example, a screen allowing the user to select "print" or "not print" is displayed (a pop-up display or the like) on the display unit 26, and determination is made based on an operation performed on the screen with the operation unit 25.

When it is determined in S111 not to print the remaining unprinted copy (copies), the present image quality adjustment process is terminated.

When it is determined in S111 to print the remaining unprinted copy (copies), the present process proceeds to S112.

In S112, a printing data transmission process is performed to cause the printer 10 to perform printing of the remaining unprinted copy (copies) in accordance with the currently set image quality parameters. Then, the present image quality adjustment process is terminated.

When it is determined in S107 that the value of the copy number counter has reached "0" (that is, when printing of the number of copies to be printed set in S101 has been completed), the present image quality adjustment process is terminated.

According to the printing system in the first embodiment, as described above, in a case where the image quality adjustment check box 38 on the print setting screen is checked, the image quality adjustment screen is displayed each time one copy is printed until printing of the set number of copies to be printed is completed. When the amendment values of the image quality parameters are adjusted and the OK button 48 is clicked on the image quality adjustment screen, an image represented by the printing data processed in accordance with newly set image quality parameters is printed. In a case where the image quality adjustment check box 38 on the print setting screen is not checked, the image quality adjustment screen is not displayed after printing an image, and a printing process in a conventional manner may be performed.

[1-5. Advantageous Effects of First Embodiment]

According to the printing system of the first embodiment as described above, in which the image quality adjustment screen is automatically displayed after printing of an image is started, a user's operation to display the image quality adjustment screen can be omitted. Thus, trouble in adjustment of the image quality parameters may be significantly reduced.

In the present printing system, it may be possible to select whether or not to display the image quality adjustment screen after a printing process of an image is started through the image quality adjustment check box 38 on the print setting screen. Accordingly, whether or not to display the image quality adjustment screen may be changed depending on situations, such that the image quality adjustment screen is displayed after a printing process of an image is started when adjustment of image quality parameters is necessary, while the image quality adjustment screen is not displayed when adjustment of image quality parameters is unnecessary. Thus, it may be possible to avoid the image quality adjustment screen from being displayed after a printing process of an image is started even when adjustment of image quality parameters is unnecessary.

Further, in the present printing system, image quality parameters used in a printing process of an image are displayed on the image quality adjustment screen after the printing process of the image is started. Accordingly, adjustment of image quality parameters in accordance with a printing result may easily be performed.

According to the present printing system, the image quality adjustment screen is displayed each time a printing process of one copy is started until printing of the set number of copies to be printed is completed. Thus, a desired limited times of adjustment of image quality parameters may be easily performed.

Also, it may be possible to stop display of the image quality adjustment screen for remaining unprinted copy (copies) before printing of the set number of copies to be printed is completed, and to perform printing of the remaining unprinted copy (copies) in accordance with image quality parameters used immediately before stopping display of the image quality adjustment screen.

Accordingly, it may be possible to avoid the image quality adjustment screen from still being displayed during the printing of the remaining unprinted copy (copies) despite that adjustment of the image quality parameters has been completed before printing of the set number of copies to be printed is completed. It may also be possible to immediately print an image once adjustment of the image quality parameters has been completed.

Additionally, in the present printing system, printing data representing an image provided by the application 27B is transmitted to the printer 10 instead of the sample image 47. In other words, the image provided by the application 27B which is a target of the user's printing process may be directly used for adjustment of the image quality parameters. Thus, image quality adjustment may be performed more accurately as compared with a case of using the sample image 47.

2. Second Embodiment

A printing system according to a second embodiment will now be described.

[2-1. Overall Configuration]

The printing system according to the second embodiment has basically a same hardware configuration as the printing system according to the first embodiment (FIG. 1) and is different in that processing of printing data in accordance with the image quality parameters is performed by the printer 10. Specifically, one difference is that the CPU 22 of the personal computer 20 performs an image quality adjustment process shown in FIG. 5 instead of the above described image quality adjustment process (FIG. 2). Another difference is that the CPU 12 of the printer 10 performs a printing process shown in FIG. 6. Same components are assigned the same reference numerals and their detailed descriptions are omitted.

[2-2. Process Performed by Personal Computer]

Figure 5:
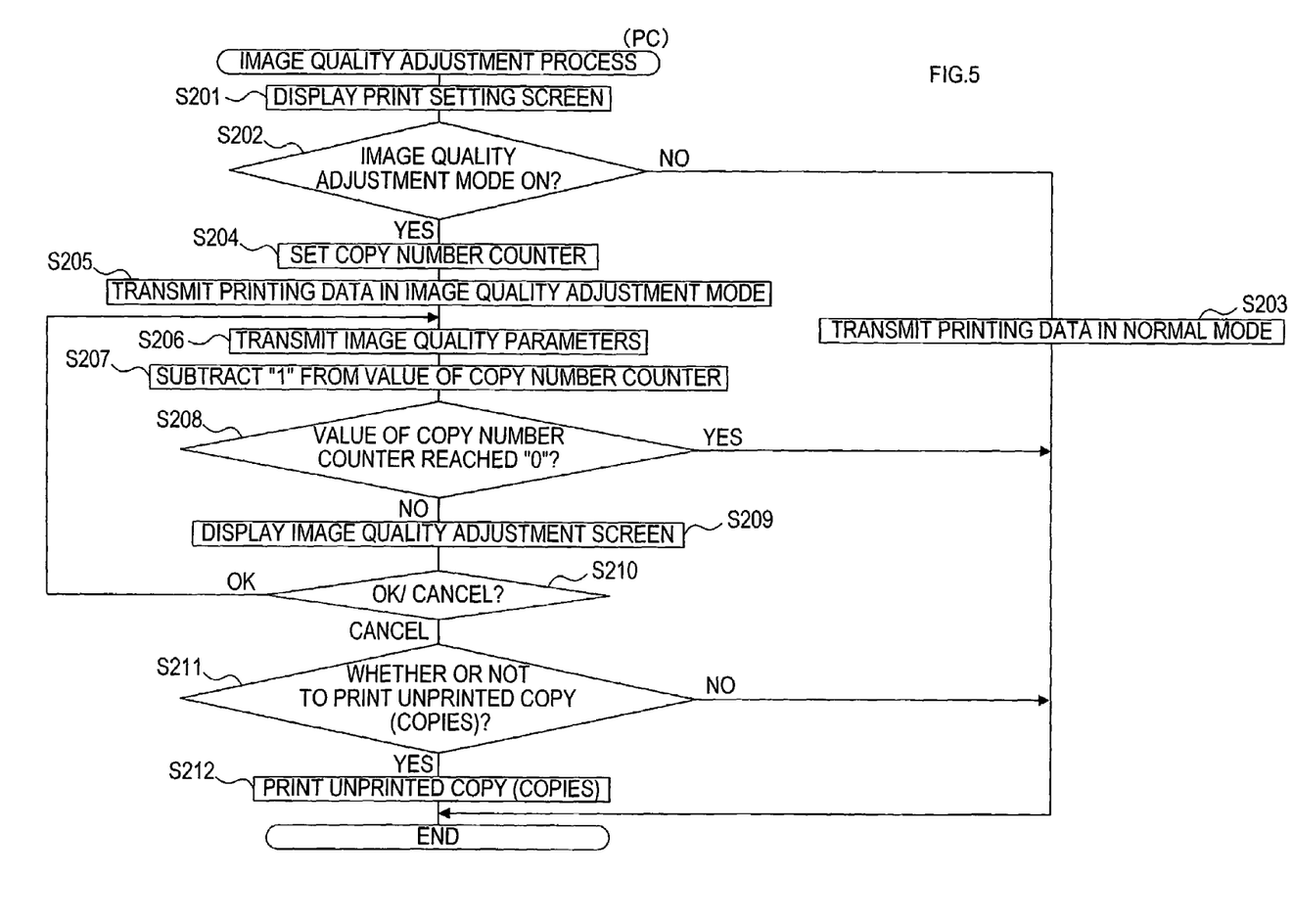
FIG. 5 is a flowchart of an image quality adjustment process in a second embodiment.

A description will now be provided with reference to a flowchart in FIG. 5 on the image quality adjustment process performed by the CPU 22 of the personal computer 20 as a processing by the printer driver 27C. In comparison with the image quality adjustment process in the first embodiment (FIG. 2), the present image quality adjustment process is different in that processing of printing data (S110) is not performed, in that image quality parameters are transmitted to the printer 10 (S206), and in that transmission of printing data in the image quality adjustment mode is performed only once regardless of the number of copies to be printed (S205). Since the processings in S201-S204 and S207-S211 in the image quality adjustment process in FIG. 5 are the same as the processings in S101-S104, S106-S109 and S111, respectively, in the image quality adjustment process in the first embodiment (FIG. 2), their detailed descriptions are omitted.

When the present image quality adjustment process is started, a print setting screen (FIG. 3) is displayed on the display unit 26 in S201. When an operation to click the OK button 39 provided on the print setting screen is performed with the operation unit 25, the present process proceeds to S202.

In S202, it is determined whether or not an image quality adjustment mode is on.

When it is determined in S202 that the image quality adjustment mode is not on, the present process proceeds to S203 and transmission of printing data in a normal mode is performed.

When it is determined in S202 that the image quality adjustment mode is on, the present process proceeds to S204, and a value of a copy number counter is set to a value which has been set in S201.

In S205, a transmission process of printing data in an image quality adjustment mode is performed.

In S206, set image quality parameters (image quality parameters adjusted on the image quality adjustment screen) are transmitted to the printer 10 through the communication unit 28.

Subsequently in S207, "1" is subtracted from the value of the copy number counter.

In S208, it is determined whether or not the value of the copy number counter has reached "0".

When it is determined in S208 that the value of the copy number counter has not reached "0", the present process proceeds to S209, and the image quality adjustment screen (FIG. 4A or 4B) is displayed on the display unit 26.

When an operation of clicking the OK button 48 or the cancel button 49 provided on the image quality adjustment screen is performed with the operation unit 25, the present process proceeds to S210.

In S210, it is determined which of an operation of clicking the OK button 48 and an operation of clicking the cancel button 49 provided on the image quality adjustment screen has been performed.

When it is determined in S210 that the operation of clicking the OK button 48 has been performed, the present process returns to S206.

In S206, the set image quality parameters (the image quality parameters adjusted on the image quality adjustment screen) are transmitted to the printer 10.

When it is determined in S210 that the operation of clicking the cancel button 49 has been performed, the present process proceeds to S211.

In S211, it is determined whether or not to print remaining unprinted copy (copies) out of the number of copies to be printed set in S201 in accordance with the currently set image quality parameters.

When it is determined in S211 not to print the remaining unprinted copy (copies), the present image quality adjustment process is terminated.

When it is determined in S211 to print the remaining unprinted copy (copies), the present process proceeds to S212.

In S212, printing of the remaining unprinted copy (copies) is performed by the printer 10. Specifically, the image quality parameters transmitted last time are transmitted for the remaining unprinted copy (copies). Then, the present image quality adjustment process is terminated.

When it is determined in S208 that the value of the copy number counter has reached "0", the present image quality adjustment process is terminated.

[2-3. Process Performed by Printer]

Figure 6:
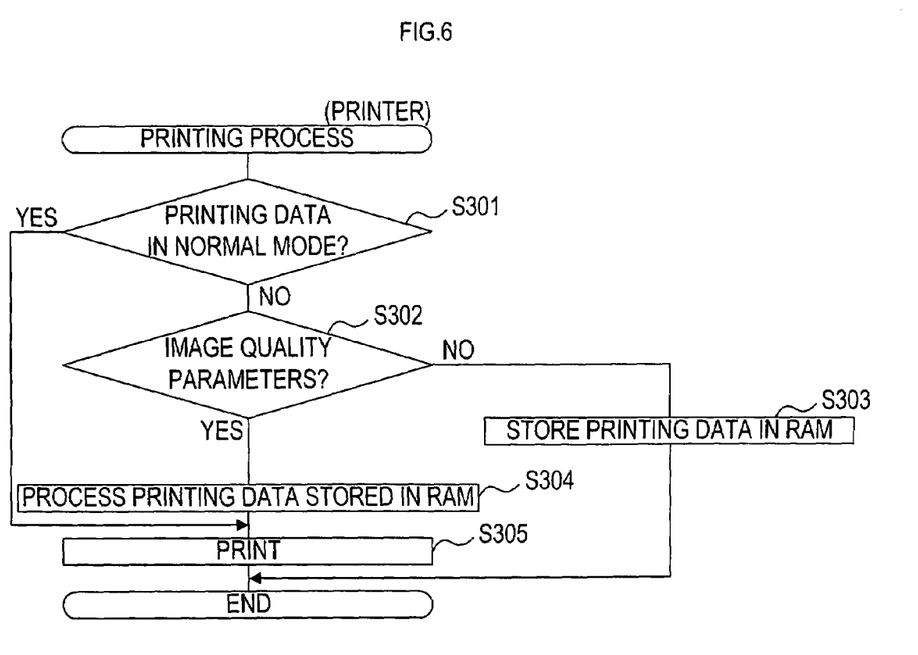
FIG. 6 is a flowchart of a printing process in the second embodiment.

A description will now be provided with reference to a flowchart in FIG. 6 on a printing process performed by the CPU 12 of the printer 10. The printing process is started when any data among printing data transmitted by a printing data transmission process in a normal mode, printing data transmitted by a printing data transmission process in an image quality adjustment mode, and image quality parameters is received through the communication unit 16.

When the printing process is started, it is determined in S301 whether or not the data received from the personal computer 20 is printing data transmitted by the printing data transmission process in the normal mode. The printing data is transmitted in S203 in the image quality adjustment process (FIG. 5). The determination as to whether or not the data is printing data transmitted by the printing data transmission process in the normal mode may be made, for example, by transmitting identification information indicating the normal mode from the personal computer 20, and by determining presence or absence of the identification information by the CPU 12.

When it is determined in S301 that the data is not printing data transmitted by the printing data transmission process in the normal mode, the present process proceeds to S302.

In S302, it is determined whether or not the data received from the personal computer 20 is image quality parameters. The image quality parameters are transmitted in S206 in the above described image quality adjustment process (FIG. 5).

When it is determined in S302 that the data received from the personal computer 20 is not image quality parameters (that is, the data is printing data transmitted by the printing data transmission process in the image quality adjustment mode), the present process proceeds to S303.

In S303, the received printing data is stored in the RAM 14. Then, the present printing process is terminated. The printing data is transmitted in S205 in the image quality adjustment process (FIG. 5).

When it is determined in S302 that the data received from the personal computer 20 is image quality parameters, the present process proceeds to S304.

In S304, the printing data stored in the RAM 14 is read out and processed in accordance with the received image quality parameters. Then, the present process proceeds to S305.

When it is determined in S301 that the data is printing data transmitted by the printing data transmission process in the normal mode, the present process proceeds to S305.

In 305, an image represented by the printing data (the received printing data in case of printing subsequent to S301, while the processed printing data in case of printing subsequent to S304) is printed. Then, the present printing process is terminated.

As described above, the printer 10 temporarily stores the printing data, transmitted by the printing data transmission process in the image quality adjustment mode, in the RAM 14. The printer 10 processes the printing data in accordance with the image quality parameters each time the image quality parameters are received, and prints an image represented by the processed printing data.

[2-4. Advantageous Effects of Second Embodiment]

According to the printing system of the second embodiment as described above, the same advantageous effects as in the printing system of the first embodiment may be achieved.

In addition, according to the printing system of the second embodiment, in the case where the number of copies to be printed is set to a plural value and the image quality parameters are adjusted each time a process of printing one copy of the image is started, transmission of printing data is performed only once. Accordingly, a number of transmissions of printing data from the personal computer 20 to the printer 10 may be reduced, and thereby a communication time may be shortened.

3. Third Embodiment

A printing system according to a third embodiment will now be described.

[3-1. Overall Configuration]

The printing system according to the third embodiment has basically a same hardware configuration as the printing system according to the first embodiment (FIG. 1) and is different in that an image may be printed while changing image quality parameters with a certain tendency within a specified range. Specifically, one difference is that the CPU 22 of the personal computer 20 performs an image quality adjustment process shown in FIG. 7 instead of the above described image quality adjustment process (FIG. 2). Another difference is that an image quality adjustment screen shown in FIG. 8 is displayed instead of the above described image quality adjustment screen (FIG. 4A or 4B). Same components are assigned the same reference numerals and their detailed descriptions are omitted.

[3-2. Process Performed by Personal Computer]

Figure 7:
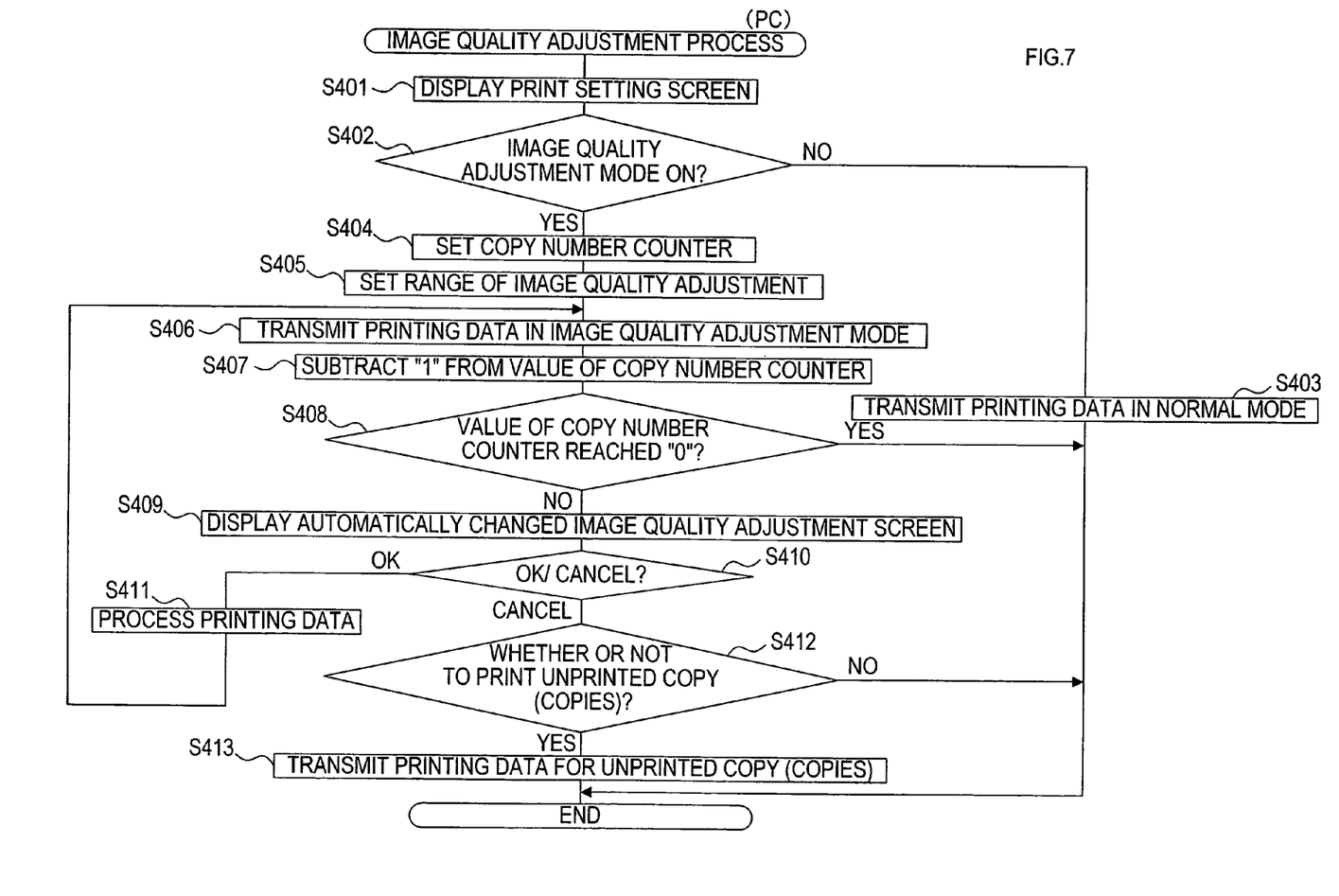
FIG. 7 is a flowchart of an image quality adjustment process in a third embodiment.
Figure 8:
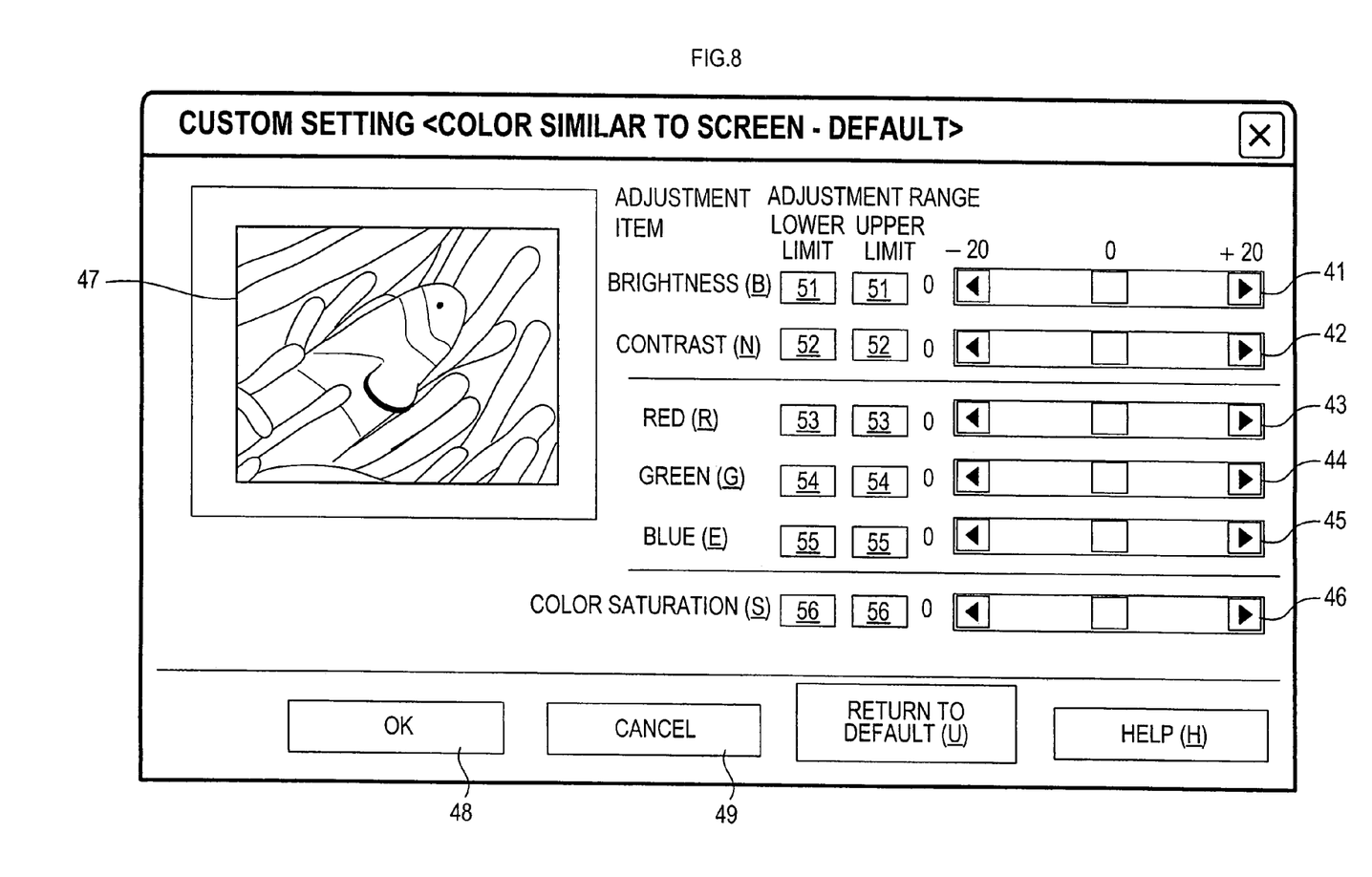
FIG. 8 is an explanatory view of an image quality adjustment screen in the third embodiment.

A description will now be provided with reference to a flowchart in FIG. 7 on the image quality adjustment process performed by the CPU 22 of the personal computer 20 as a processing by the printer driver 27C in the printing system in the third embodiment.

In comparison with the image quality adjustment process in the first embodiment (FIG. 2), the present image quality adjustment process is different in that an image quality adjustment screen (FIG. 8) is displayed, before printing is started, to set an adjustment range of the image quality parameters (S405), and in that amendment values are changed in a stepwise manner within the set adjustment range of the image quality parameters (S409). Since the processings in S401-S404, S406-S408, and S410-S413 in the image quality adjustment process in FIG. 7 are the same as the processings in S101-S107 and S109-S112 in the image quality adjustment process in the first embodiment (FIG. 2), their detailed descriptions are omitted.

When the present image quality adjustment process is started, a print setting screen (FIG. 3) is displayed on the display unit 26 in S401. When an operation to click the OK button 39 provided on the print setting screen is performed with the operation unit 25, the present process proceeds to S402.

In S402, it is determined whether or not an image quality adjustment mode is on.

When it is determined in S402 that the image quality adjustment mode is not on, the present process proceeds to S403, and a printing data transmission process in a normal mode is performed.

When it is determined in S402 that the image quality adjustment mode is on, the present process proceeds to S404, and a value of a copy number counter is set to a number of copies to be printed which has been set in S401.

In S405, an adjustment range of the image quality parameters is set. Specifically, the image quality adjustment screen shown in FIG. 8 is displayed on the display unit 26 to allow input of the adjustment range.

In comparison with the image quality adjustment screen in the first embodiment (FIG. 4A or 4B), the present image quality adjustment screen is different in that value input boxes 51, 52, 53, 54, 55 and 56 are provided on left sides of the sliders 41-46, respectively, to input lower limits and upper limits of respective adjustment ranges. Specifically, each of the amendment values of the respective image quality parameters may be set to a specified range on the image quality adjustment screen of the third embodiment. Each of the amendment values of the respective image quality parameters must be set to a specific value on the image quality adjustment screen of the first embodiment.

When an operation of clicking the OK button 48 or the cancel button 49 provided on the image quality adjustment screen is performed with the operation unit 25, the image quality parameters are set in accordance with current setting details on the image quality adjustment screen. Then, the present process proceeds to S406.

In S406, a printing data transmission process in the image quality adjustment mode is performed.

Subsequently in S407, "1" is subtracted from the value of the copy number counter.

In S408, it is determined whether or not the value of the copy number counter has reached "0". When it is determined in S408 that the value of the copy number counter has not reached "0", the present process proceeds to S409, and the image quality adjustment screen (FIG. 8) is displayed on the display unit 26.

Amendment values indicated on the image quality adjustment screen are changed with a certain tendency each time one copy of an image is printed within the adjustment range of the image quality parameters set in S405. In the present embodiment, when the number of copies to be printed is set to a plural number M, each of the amendment values (initial values to be indicated on the image quality adjustment screen) for an N-th copy ($1 \leq N \leq M$) is set to a value calculated by the following equation.

Amendment value for the N-th copy=Lower limit+
(Upper limit−Lower limit)×$(N-1)/(M-1)$ For example, in a case where one of the image quality parameters is set to an adjustment range having a lower limit of "0" and an upper limit of "+8", and the number of copies to be printed is set to "5", the amendment value is automatically changed from "0"→"2"→"4"→"6"→"8" each time one copy is printed. The amendment value, which is automatically set as above, is indicated as the initial value on the image quality adjustment screen. The amendment value may be adjusted by a user in a same manner as in the first embodiment.

When an operation of clicking the OK button 48 or the cancel button 49 provided on the image quality adjustment screen is performed with the operation unit 25, the present process proceeds to S410.

In S410, it is determined which of an operation of clicking the OK button 48 and an operation of clicking the cancel button 49 provided on the image quality adjustment screen has been performed.

When it is determined in S410 that the operation of clicking the OK button 48 has been performed, the present process proceeds to S411.

In S411, the printing data is processed in accordance with the set image quality parameters. Then, the present process returns to S406.

When it is determined in S410 that the operation of clicking the cancel button 49 has been performed, the present process proceeds to S412.

In S412, it is determined whether or not to print remaining unprinted copy (copies) out of the number of copies to be printed set in S401 in accordance with the currently set image quality parameters.

When it is determined in S412 not to print the remaining unprinted copy (copies), the present image quality adjustment process is terminated.

When it is determined in S412 to print the remaining unprinted copy (copies), the present process proceeds to S413.

In S413, a printing date transmission process is performed to cause the printer 10 to perform printing of the remaining unprinted copy (copies). Then, the present image quality adjustment process is terminated.

When it is determined in S408 that the value of the copy number counter has reached "0", the present image quality adjustment process is terminated.

[3-3. Advantageous Effects of Third Embodiment]

According to the printing system of the third embodiment as described above, the same advantageous effects as in the printing system of the first embodiment may be achieved.

In addition, according to the printing system of the third embodiment, in the case where the number of copies to be printed is set to a plural number and the image quality parameters are adjusted each time a process of printing one copy of the image is started, the image quality parameters are changed with a specified tendency. Accordingly, a plurality of printing results in accordance with the image quality parameters changed with the specified tendency may be obtained, and thus adjustment of the image quality parameters may be efficiently performed.

4. Fourth Embodiment

A printing system according to a fourth embodiment will now be described.

[4-1. Overall Configuration and Process Performed by Personal Computer]

The printing system according to the fourth embodiment has basically a same hardware configuration as the printing system according to the first embodiment (FIG. 1) and is partially different in steps in the image quality adjustment process.

Figure 9:
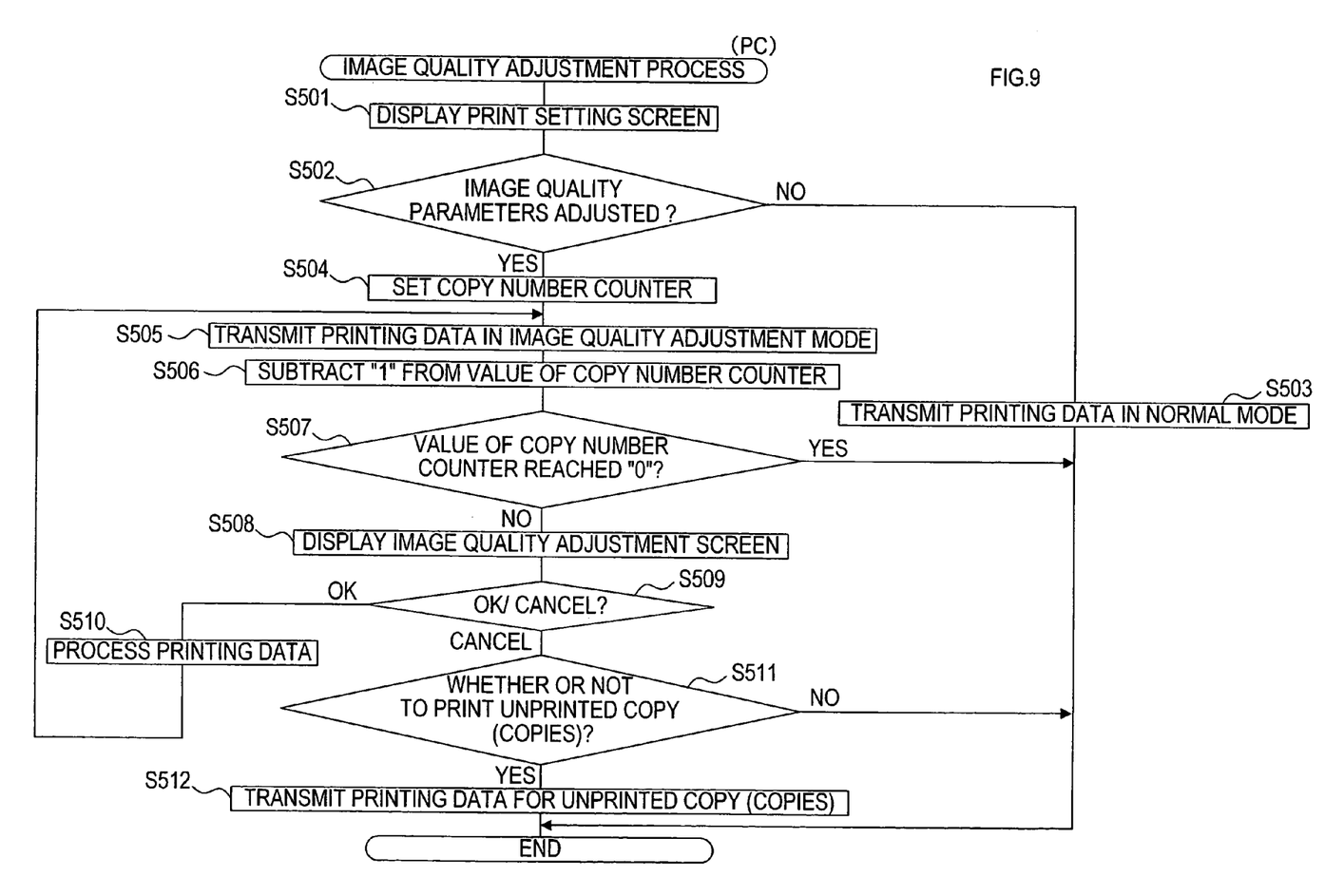
FIG. 9 is a flowchart of an image quality adjustment process in a fourth embodiment.

Specifically, the CPU 22 of the personal computer 20 performs an image quality adjustment process shown in FIG. 9, which is different only in that a processing in S502 is performed instead of the processing in S102 in the above described image quality adjustment process (FIG. 2). Since the processings in S501 and S503-S512 are the same as the processings in S101 and S103-S112, respectively, only the processing in S502 will be described below.

In S502, it is determined whether or not image quality parameters have been adjusted. Specifically, the personal computer 20 is configured to display the image quality adjustment screen by a specified operation with the operation unit 25 in a state where the print setting screen is displayed (S501), and it is determined whether or not adjustment of amendment values has been performed on the image quality adjustment screen.

When it is determined in S502 that adjustment of amendment values has not been performed on the image quality adjustment screen (S502: NO), the present process proceeds to S503. When it is determined in S502 that adjustment of amendment values has been performed on the image quality adjustment screen (S502: YES), the present process proceeds to S504. That is, the image quality adjustment screen is not displayed after printing process is started only when image quality parameters have not been adjusted (only when each of the amendment values is set to a reference value "0") before printing process is started.

[4-2. Advantageous Effects of Fourth Embodiment]

According to the printing system of the fourth embodiment as described above, same advantageous effects as in the printing system of the first embodiment may be achieved.

In addition, according to the printing system of the fourth embodiment, in the case where each of the image quality parameters is set to the reference value (i.e., not adjusted), adjustment of the image quality parameters is considered unnecessary, and thus the image quality adjustment screen is not displayed after the printing process of the image is started. Accordingly, it may be possible to automatically determine whether or not to display the image quality adjustment screen after the printing process of the image is started.

5. Other Embodiments

Although specific embodiments of the present invention have been illustrated and described herein, it is to be understood that the present invention may be embodied in various forms without departing from the scope of the present invention.

In the above described embodiments, an inquiry is made to a user as to whether or not to print remaining unprinted copy (copies) when an operation of clicking the cancel button 49 on the image quality adjustment screen is performed. However, it may be possible, for example, to terminate the process without either making such an inquiry or printing the remaining unprinted copies.

Also in the above described embodiments, the image quality adjustment screen is capable of being displayed each time the printing process of one copy is started until printing of the set number of copies to be printed is completed. However, it may be possible, for example, to display the image quality adjustment screen each time a printing process of one page is started. This may lead to a more frequent display of the image quality adjustment screen and thus may facilitate a more detailed image quality adjustment.

Alternatively, it may be possible to display the image quality adjustment screen after the entire printing process of the set number of copies to be printed is started or completed. This may facilitate printing of all the images for the set number of copies to be printed under the same condition.

Although each of the printing systems in the above described embodiments is constituted by the printer 10 and the personal computer 20 inter-communicable via a network, by way of example, the printing system should not be limited to a system constituted by a plurality of apparatuses. For example, the printing system may be a single apparatus (such as a printer, a copying machine, etc.) including the display unit 26 and the printing unit 15.

What is claimed is:

1. A printing system comprising:
   a processing device that processes image data in accordance with a set image quality parameter;
   a printing device that performs a printing process of an image represented by the image data processed by the processing device;
   a display device that displays an adjustment screen for adjusting the image quality parameter after the printing process of the image by the printing device is started;
   a condition setting device that sets a display condition in accordance with information inputted externally, the display condition indicating whether or not the adjustment screen is displayed on the display device; and
   an inhibition device that inhibits the display device from displaying the adjustment screen after the printing process of the image by the printing device is started, when the display condition indicates that the adjustment screen is prohibited to be displayed after the printing process of the image is started,
   wherein the display device displays the adjustment screen after the printing process of the image by the printing device is started, when the display condition indicating that the adjustment screen is permitted to be displayed after the printing process of the image is started has been set before starting the printing process.

2. The printing system as set forth in claim 1, further comprising:
   a restriction device that restricts, when the printing process of an image with the image quality parameter set to a reference value is started, the display device from displaying the adjustment screen after the printing process of the image by the printing device is started.

3. The printing system as set forth in claim 1, wherein the display device displays, on the adjustment screen displayed after the printing process of the image by the printing device is started, the image quality parameter used in the printing process.

4. The printing system as set forth in claim 1, further comprising a copy number setting device that sets a number of copies to be printed in accordance with information inputted externally,
   wherein the display device displays the adjustment screen each time a printing process of one copy is started until a number of printed copies of the image by the printing device reaches the number of copies to be printed set by the copy number setting device.

5. The printing system as set forth in claim 4, further comprising a stopping device that stops display of the adjustment screen for a remaining number of copies to be printed before the number of printed copies of the image by the printing device reaches the number of copies to be printed set by the copy number setting device,
   wherein when display of the adjustment screen is stopped by the stopping device, the printing device performs the printing process of the image for the remaining number of at least one copy to be printed using the image quality parameter used immediately before the display of the adjustment screen is stopped.

6. The printing system as set forth in claim 4, wherein the display device changes the image quality parameter in a stepwise manner within an adjustment range of the image quality parameter each time the printing process of one copy is started when the number of copies to be printed is set to a plural value by the copy number setting device.

7. The printing system as set forth in claim 1, wherein an information processing apparatus, including the display device, and a printing apparatus, including the printing device and the processing device, are inter-communicable with each other.

8. The printing system as set forth in claim 7, wherein the information processing apparatus includes:
   an image transmission device that transmits image data to the printing apparatus; and
   a parameter transmission device that transmits the image quality parameter to the printing apparatus.

9. The printing system as set forth in claim 8, wherein the printing apparatus includes a storage device that stores image data received from the information processing apparatus, and
   wherein each time the processing device receives the image quality parameter from the information processing apparatus, the processing device reads out image data stored in the storage device and processes the image data in accordance with the received image quality parameter.

10. The printing system as set forth in claim 9, wherein the information processing apparatus is capable of executing application software, and
    wherein the image transmission device transmits image data representing an image provided by the application software to the printing apparatus.

11. The printing system as set forth in claim 1, wherein the display device displays the adjustment screen for adjusting the image quality parameter after image printing corresponding to the printing process of the image performed by the printing device is completed, when the display condition indicating that the adjustment screen is permitted to be displayed after the printing process of the image is started has been set before starting the printing process.

12. The printing system as set forth in claim 1, wherein the display device displays the adjustment screen for adjusting the image quality parameter after the printing process of the image by the printing device is started and before image printing corresponding to the printing process is completed, when the display condition indicating that the adjustment screen is permitted to be displayed after the printing process of the image is started has been set before starting the printing process.

13. A printing apparatus comprising:
    a storage device that stores image data received from an information processing apparatus;
    a processing device that reads out the image data stored in the storage device and processes the image data in accordance with a received image quality parameter each time the processing device receives the image quality parameter from the information processing apparatus;
    a printing device that performs a printing process of an image represented by the image data processed by the processing device; and
    a display device that displays an adjustment screen for adjusting the image quality parameter after the printing process of the image is started, wherein:

displaying the adjustment screen is controlled by a display condition which is set by an external input, when the display condition has been set to allow displaying the adjustment screen before starting the printing process, the display device displays the adjustment screen after the printing process of the image started, and when the display condition has been set to prohibit displaying the adjustment screen before starting the printing process, the display device does not display the adjustment screen after the printing process of the image started.

14. The printing apparatus as set forth in claim 13, wherein the information processing apparatus includes:

an image transmission device that transmits the image data; and a parameter transmission device that transmits the image quality parameter, and wherein the printing apparatus is inter-communicable with the information processing apparatus.

15. The printing system as set forth in claim 6, further comprising a setting device that sets a lower limit and a higher limit of the adjustment range of the image quality parameter, wherein the display device changes the adjustment range of the image quality parameter in a stepwise manner within the range between the upper limit and the higher limit.

* * * * *